Nov. 11, 1930.  C. W. VAN RANST  1,781,354

STARTING CRANK ARRANGEMENT FOR FRONT DRIVE AUTOMOBILES

Filed March 9, 1929

Inventor
CORNELIUS W. VAN RANST
By Arthur M^c Neece
Attorney.

Patented Nov. 11, 1930

1,781,354

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

STARTING-CRANK ARRANGEMENT FOR FRONT-DRIVE AUTOMOBILES

Application filed March 9, 1929. Serial No. 345,796.

This invention relates to improvements in starting crank arrangements for front drive automobiles and it consists of the matters hereinafter described and more particularly pointed out in the appended claims.

In front wheel drive automobiles, the location of the differential and transmission in front of the engine presents a problem in providing a suitable means whereby the engine may be hand cranked from the front of the automobile for starting when such a method becomes necessary.

The primary object of the present invention is to provide a simple and efficient arrangement of parts whereby the engine may be readily hand cranked from the front of the car without difficulty in the same manner and in the same direction as is employed in automobiles today in use.

Still another object of the invention is to so correlate the parts thereof that the hand crank may be inserted into proper position, through a portion of the differential casing to there engage a normally non-rotative shaft which becomes automatically connected with the engine shaft by the mere act of inserting the crank in place.

These objects of the invention as well as others, together with the many advantages thereof, will more fully appear as I proceed with my specification.

In the drawing:—

Figure 1:
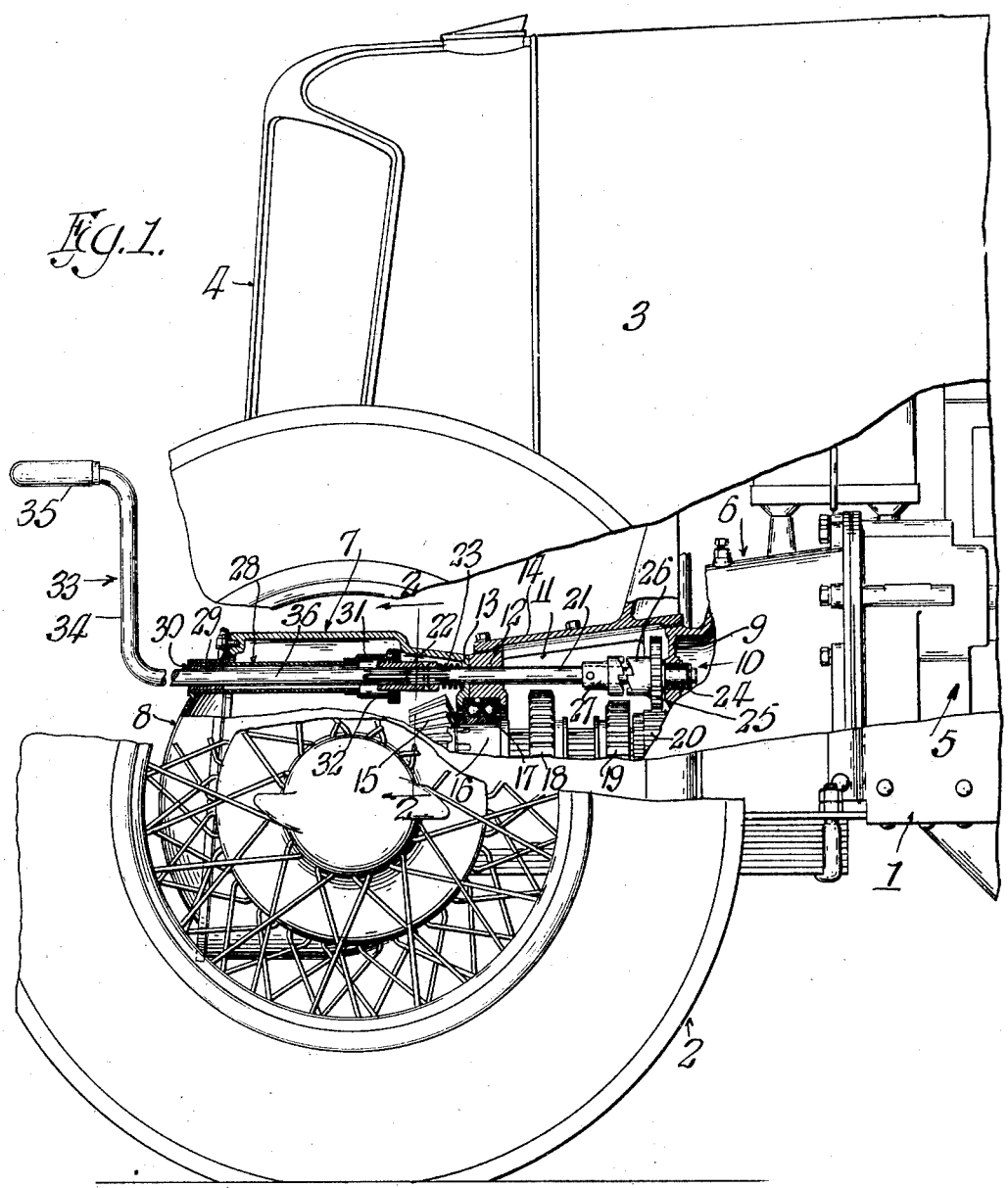
Fig. 1 is a view in side elevation of the front end of a front drive automobile, with parts broken away to more clearly illustrate my improved starting crank arrangement.
Figure 2:
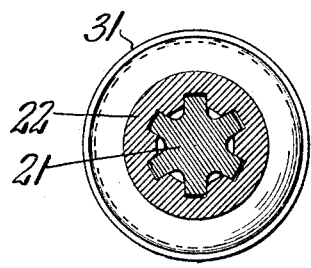
Fig. 2 is a transverse vertical detail sectional view on an enlarged scale as taken on the line 2—2 of Fig. 1.

Referring now in detail to that embodiment of the invention, illustrated in the accompanying drawing, 1 indicates as a whole one of the side frame members of a front drive automobile, 2 indicates one of the front wheels thereof, 3 indicates as a whole the hood and 4 indicates the associated radiator shell.

5 indicates the engine which is located under the hood and as in front wheel drive automobiles in disposed a substantial distance to the rear of the radiator shell and is supported from the side frame members in any suitable manner. To the front end of the engine is secured a combined clutch and transmission gear casing 6 and to the front end of said casing is secured the differential gear casing 7. The front end of the casing 7 includes a removable cover plate 8 by means of which access may be had to the differential gear within said casing when necessary.

In the casing 6 is a vertically disposed intermediate partition or wall 9 dividing said casing into the clutch compartment 10 and transmission compartment 11 respectively. The front end of the compartment 11 is defined by a wall 12 with which the rear wall 13 of the differential casing closely engages. The transmission gear compartment which is open at its top is there provided with a removable cover plate 14.

In the casing 7 is located the usual differential gearing (not shown) which is operatively connected to both front wheels 2 to drive the same. This gearing is driven by a pinion 15 on the main shaft 16 of the transmission which is journalled at one end to the rear of said pinion 15 in suitable bearings 17 in the wall 13. On said shaft to the rear of the wall 13 is mounted several of the gears 18, 19 and 20 respectively of the transmission, the latter gear being directly connected with the engine 5.

Journalled in the walls 9 and 12 respectively of the casing, parallel with but above the shaft 16 is a second shaft 21, the forward end of which extends through the wall 13 and into the interior of the differential casing. On the extreme forward end of said shaft is secured a splined sleeve 22, which sleeve has splined and pinned connection with said end of shaft. A helical expansion spring 23 surrounds said shaft end between said sleeve 22 and wall 13 in a manner normally urging said shaft forwardly, this forward movement being limited by a washer 24 on the rear end of the shaft.

Loose on the shaft 21 just forwardly of the wall 9, but suitably held against endwise movement is a spur pinion 25. This pinion meshes with the gear 20 before mentioned and on the front face of said pinion is found a clutch hub 26. Secured to the shaft 21 and normally in spaced relation forwardly of said pinion is a clutch collar 27 which when the shaft 21 is moved rearwardly against the action of the spring 23 may be brought into operative engagement with the clutch hub 26 of said pinion 25 to lock the same to the shaft 21.

28 indicates a hand crank tube arranged coaxially with the shaft 21 which tube is anchored at its front end in an embossment 29 in the cover plate 8 of the differential casing. In said front end of said tube is fixed a bearing bushing 30. On the rear end of said tube is secured a tube portion 31 of enlarged diameter which bears upon the sleeve 22 by means of an annular member 32 of suitable material. Normally that end of the tube exposed through the cover plate 8 is closed by a cap (not shown) fitting upon the cover-plate embossment 29.

33 indicates as a whole a crank, similar in form to those employed in cranking automobile engines when necessary. Said crank includes an arm 34 with a short operating handle 35 at one end and a longer stem 36 at the other end, the extremity of the stem being splined for engagement with the sleeve 22 on the front end of the shaft 21.

When it is necessary to use the crank in starting the engine 5 the splined end of the stem of the crank is inserted through the bushing 30 and is then moved longitudinally of the guide tube into engagement with the front end of the splined sleeve 22. When the extremity of said stem engages the extremity of the shaft 21, said shaft will be moved longitudinally rearward against the action of the spring 23 until the clutch collar 27 moves into operative engagement with the clutch hub 26 of the pinion 25. When the crank is now turned in the usual manner and direction of cranking an automobile engine, said gear 25 meshing with the gear as before mentioned will cause the crank shaft of the engine to be turned over so that with all other engine conditions in proper order the engine of course will start. So soon as the engine starts, turning and endwise movement on the crank is discontinued, the crank is withdrawn and the remaining parts return to their normal inoperative positions under the action of the spring 23.

In front wheel drive automobiles, the engine is reversed end for end with respect to the position the parts occupy in a rear wheel drive automobile. That is the fly wheel, clutch, transmission and differential are disposed to the front of the engine instead of to the rear thereof. In my improved starting crank arrangement, the provision of the gear 25 permits the cranking of the engine in a clockwise direction so that the usual custom is in no manner disturbed. Thus there can be no confusion in the mind of the operator.

The parts are so disposed as to be enclosed within the transmission and differential casings and are out of the way and the tube 28 accurately guides the stem of the crank into engagement with the shaft 21 so that it is unnecessary to blindly feel for the proper connection of the crank as in automobiles as now made. The parts which are few in number are strong and sturdy and are easily assembled and when assembled are indeed efficient for their intended purpose.

While in describing the invention, I have referred in detail to the form, arrangement and construction of the various parts thereof, the same is to be considered merely as descriptive of one embodiment of the invention so that I do not wish to be limited thereto except as may be specifically pointed out in the appended claims.

I claim as my invention:—

1. An automobile of the front wheel drive type embodying therein an engine and transmission and differential casings at the front end thereof in the order named, a shaft journalled in the transmission casing and capable of a limited longitudinal movement with respect thereto, a gear loose on one end of the shaft and operatively connected to the engine, the other end of said shaft being disposed in the differential casing and formed for engagement by a hand crank and means fixed on said shaft and adapted in one endwise movement of the shaft to engage said gear to rotatively lock the same thereto.

2. In an automobile, a transmission casing and a differential casing on the front end thereof, a shaft journalled in the transmission casing and capable of a limited longitudinal movement with respect thereto, a gear loose on one end of said shaft, the other end of which is disposed in said differential casing and is formed for engagement by a hand crank, means on said shaft to lock the gear thereto when said shaft is moved in one direction, and means normally urging the shaft in the other direction to remove said locking means from said gear.

3. In an automobile, a transmission casing and a differential casing on the front end thereof, a shaft journalled in the transmission casing and capable of a limited longitudinal movement with respect thereto, a gear loose on one end of said shaft, the other end of which is disposed in said differential casing and is formed for engagement by a hand crank, means on said shaft to lock the gear thereto when said shaft is moved in one direction, means normally urging the shaft in the other direction to remove said locking means from the gear and guide means in said differential casing for guiding the stem of said hand crank into engagement with said other end of said shaft.

4. In an automobile, a transmission casing and a differential casing on the front end thereof, a shaft journalled in the transmission casing and capable of a limited longitudinal movement with respect thereto, a gear loose on one end of said shaft, the other end of which is disposed in said differential casing and is formed for engagement by a hand crank, means on said shaft to lock the gear thereto when said shaft is moved in one direction, means normally urging the shaft in the other direction to remove said locking means from the gear, and a tube supported at one end by a part of the differential casing and at the other end engaged with said other end of said shaft.

5. In an automobile, a transmission casing and a differential casing on the front end thereof, a shaft journalled in the transmission casing and capable of a limited longitudinal movement therein and having an end disposed in said differential casing, a splined sleeve on said end of said shaft, a gear loose on said shaft within the transmission casing, means on said shaft for locking the gear thereto when the shaft is in one endwise position and a tube opening at one end through a part of said differential casing and bearing at its other end upon said sleeve, which tube is adapted to guide the stem of a hand crank into engagement with said splined sleeve.

6. In an automobile, a transmission casing and a differential casing operatively connected thereto, a crankable shaft arranged in said transmission casing and a tube positioned in the differential casing and aligned with said shaft and serving to guide the stem of a crank into operative engagement with one end of said shaft.

7. In an automobile, a transmission casing and a differential casing operatively connected thereto, a crankable shaft arranged in said transmission casing and having one end extending into said differential casing and a tube positioned in said differential casing and aligned with said shaft and serving to guide the stem of a crank into operative engagement with said end of the shaft.

8. In an automobile, a transmission casing and a differential casing operatively connected thereto, a crankable shaft having one end disposed in the differential casing and a tube supported at one end in the differential casing and supported at the other end upon said end of said shaft and serving to guide the stem of a crank into operative engagement with said end of the shaft.

In testimony whereof, I have hereunto set my hand, this 6th day of March, 1929.

CORNELIUS W. VAN RANST.